United States Patent
Yang et al.

(10) Patent No.: US 6,572,789 B1
(45) Date of Patent: Jun. 3, 2003

(54) CORROSION INHIBITORS FOR AQUEOUS SYSTEMS

(75) Inventors: Bo Yang, Naperville, IL (US); Peter E. Reed, Plainfield, IL (US); John D. Morris, Naperville, IL (US)

(73) Assignee: Ondeo Nalco Company, Naperville, IL (US)

( * ) Notice: Subject to any disclaimer, the term of this patent is extended or adjusted under 35 U.S.C. 154(b) by 0 days.

(21) Appl. No.: 10/010,021

(22) Filed: Dec. 6, 2001

Related U.S. Application Data

(63) Continuation-in-part of application No. 09/824,492, filed on Apr. 2, 2001, now abandoned.

(51) Int. Cl.$^7$ .............................................. C23F 11/167
(52) U.S. Cl. ........................... 252/389.23; 252/400.23; 252/80; 252/387; 422/12; 422/15
(58) Field of Search ........................... 252/387, 389.23, 252/389.24, 397, 400.23, 400.24, 80, 82; 422/12, 13, 15; 210/699, 697

(56) References Cited

U.S. PATENT DOCUMENTS

| 4,088,678 A | 5/1978 | Matt et al. |
| 4,606,890 A | 8/1986 | Fisk |
| 5,018,577 A | 5/1991 | Pardue et al. |
| 5,023,000 A | 6/1991 | Kneller et al. |
| 5,085,794 A | 2/1992 | Kneller et al. |
| 5,606,105 A | 2/1997 | Davis et al. |

FOREIGN PATENT DOCUMENTS

| GB | 1521440 | 8/1978 |

*Primary Examiner*—Joseph D. Anthony
(74) *Attorney, Agent, or Firm*—Michael B. Martin; Thomas M. Breininger

(57) ABSTRACT

A method of inhibiting corrosion in aqueous systems comprising adding to the system a composition comprising mono, bis and oligomeric phosphinosuccinic acid adducts and a method of preparing a composition comprising mono, bis and oligomeric phosphinosuccinic acid adducts comprising adding hypophosphite to fumaric acid slurry or solution in water to create a reaction mixture; and effecting a reaction by introducing a free radical initiator to the reaction mixture.

4 Claims, No Drawings

CORROSION INHIBITORS FOR AQUEOUS SYSTEMS

CROSS REFERENCE TO RELATED APPLICATIONS

This is a continuation in part of co-pending Ser. No. 09/824,492, filed Apr. 2, 2001 now abandoned.

FIELD OF THE INVENTION

This invention relates to a new class of phosphinic acid-based corrosion inhibitors, to methods of preparing the inhibitors and to use of the inhibitors to inhibit corrosion in ferrous metal aqueous systems.

BACKGROUND OF THE INVENTION

Ferrous metals, such as carbon steel, are one of the most commonly used structural materials used in industrial aqueous systems. It is well known that corrosion of the metal is one of the major problems in industrial aqueous systems having ferrous metal in contact with an aqueous solution. Loss of metals due to general corrosion leads to deterioration of the structural integrity of the system because of material strength reduction. It can also cause other problems elsewhere in the system, such as under-deposit corrosion, reduction of heat transfer efficiency or even blockage of the flow lines due to the transport and accumulation of corrosion products in places with low flow rates or geometric limitations.

Corrosion inhibitors can be used to inhibit the corrosion of ferrous metals in aqueous or water containing systems. These aqueous systems, include, but are not limited to, cooling water systems including open recirculating, closed, and once-through systems; systems used in petroleum production (e.g., well casing, transport pipelines, etc.) and refining, geothermal wells, and other oil field applications; boilers and boiler water systems or systems used in power generation, mineral process waters including mineral washing, flotation and benefaction; paper mill digesters, washers, bleach plants, white water systems and mill water systems; black liquor evaporators in the pulp industry; gas scrubbers and air washers; continuous casting processes in the metallurgical industry; air conditioning and refrigeration systems; building fire protection heating water, such as pasteurization water; water reclamation and purification systems; membrane filtration water systems; food processing streams and waste treatment systems as well as in clarifiers, liquid-solid applications, municipal sewage treatment systems; and industrial or municipal water distribution systems.

Localized corrosion such as pitting may pose even a greater threat to the normal operation of the system than general corrosion because such corrosion will occur intensely in isolated small areas and is much more difficult to detect and monitor than general corrosion. Localized corrosion may cause perforation quickly and suddenly without giving any easily detectable early warning. Obviously, these perforations may cause leaks that may require unscheduled shutdown of the industrial aqueous system. Sudden failure of equipment due to corrosion could also result in environmental damage and/or present a serious threat to the safety of plant operations.

Corrosion protection of ferrous metal in industrial aqueous systems is often achieved by adding a corrosion inhibitor. For example, many metallic ion corrosion inhibitors such as $CrO_4^{2-}$, $MoO_4^{2-}$, and $Zn^{2+}$ have been used alone or in combination in various chemical treatment formulations. These inhibitors, however, have been found to be toxic and detrimental to the environment and their use in open-recirculation cooling water systems is generally restricted. Inorganic phosphates such as orthophosphate and pyrophosphate are also widely used. The inorganic phosphates have been found to contribute to scale formation (e.g., calcium phosphate, iron phosphate and zinc phosphate salts) if used improperly.

In order to obtain satisfactory corrosion protection and scale control at the same time, a robust treatment program and frequent testing and monitoring to ensure conformance are often required. Due to changes in water chemistry (e.g., phosphates, pH, $Ca^{2+}$, etc.) or operating conditions (e.g., temperature, flow rate, polymer dosages, etc.), these requirements may be difficult to fulfill, especially in systems with a long holding time index (e.g., >3 days).

"Holding time index" is a term used to define the half-life of an inert species such as $K^+$ added to an evaporative cooling system. Evaporative cooling systems with a long holding time index put great demand on treatment chemicals as these chemicals must remain stable and function properly over long periods of time.

Orthophosphate and pyrophosphate are often used together to provide optimal corrosion protection, especially against carbon steel pitting corrosion. Orthophosphate is generally considered as an anodic corrosion inhibitor. Pyrophosphate is considered as a cathodic corrosion inhibitor.

It is well known that the combined use of an anodic inhibitor and a cathodic inhibitor could provide substantial synergistic benefits for reducing both localized (i.e., pitting) and general corrosion. Unfortunately, pyrophosphate is not stable in cooling water systems as it reverts to orthophosphate via a hydrolysis process. The reversion rate depends on many factors including system holding time index, temperature, pH, metal ion concentrations and bacteria activity. Furthermore, the reversion rate in a system is generally not predictable. In order to maintain satisfactory corrosion protection performance, a certain level of pyrophosphate (e.g., >1.5 ppm p-$PO_4$) has to be maintained in the system by frequent monitoring and activating product feed when the level is lower than the specified value. Although this approach can be successful, it has a number of major drawbacks.

The drawbacks include the fact that maintenance of pyrophosphate increases the dosage demand of polymer dispersant and poses an even greater threat of phosphate scale formation due to the presence of higher total inorganic phosphate level in the water, especially when "upsets" occur. Upsets in the context of the usage herein refer to unanticipated changes in the concentration of inorganic phosphate or sudden changes in pH, cycle of concentration and substantial increase of temperature due to non-steady state operations in cooling waters. Furthermore, in some systems with very long holding time index (HTI), maintaining a certain specified level of pyrophosphate is often impossible with an acceptable pyrophosphate feed dosage.

Some organic phosphonates, such as 2-phosphono-butane-1,2,4-tricarboxylic acid (PBTC), 1-hydroxyethylidene-1,1-diphosphonic acid (HEDP), and aminotrimethylene-phosphonic acid (AMP) have also been used previously as corrosion inhibitors alone or in combination with other corrosion inhibitors in various chemical treatment formulations. The effectiveness of these phosphonate base treatments, however, is generally substantially lower than the treatments based on inorganic inhibitors.

Some hydroxycarboxylic acids such as gluconic acid, sacharic acid, citric acid, tartaric acid and lactobionic acid have also been used in some treatment formulations. The use of these acids, however, results in a major challenge to control microbiological growth because these hydroxycarboxylates are easily consumable nutrients for bacteria growth. In addition, their corrosion inhibition effectiveness is also much lower than the inorganic corrosion inhibitors. Therefore, they are typically used in low demand and easy to treat systems, such as some comfort cooling systems.

U.S. Pat. No. 4,606,890 discloses that 2-hydroxyphosphonoacetic acid (HPA) can be used as a corrosion inhibitor in cooling water. HPA was found to be a much more effective corrosion inhibitor than HEDP and PBTC (See, A. Yeoman and A. Harris, Corrosion/86, paper no. 14, NACE (1986)). However, HPA is not halogen stable and it will revert to orthophosphate in the presence of halogen based biocides. Since bleach or NaOBr are the most widely used biocides in cooling water systems, the halogen instability of HPA limits its application potential and reduces its effectiveness. In addition, HPA is found to be a relatively ineffective $CaCO_3$ scale inhibitor.

In order to address some of the limitations of HPA, an organophosphonic acid mixture has been used by many as mild steel corrosion inhibitor in cooling water applications (see, U.S. Pat. No. 5,606,105). The active ingredients of such inhibitors are a mixture of organophosphonic acids, H-[CH(COONa)CH(COONa)]$_n$—PO$_3$Na$_2$, where n<5 and n(mean)=1.4, hereinafter referred to as "PCAM". This mixture is halogen stable under cooling water application conditions. In addition, these organophosphonic acids are said to be a better $CaCO_3$ scale inhibitor than HPA.

U.S. Pat. No. 5,023,000 discloses and claims a method for controlling the deposit of calcium carbonate scale on the structural parts of a system exposed to alkaline cooling water containing calcium carbonate under deposit forming conditions. This patent addresses the shortcomings to two counterpart patents GB No. 1,521,440 and U.S. Pat. No. 4,088,678. These patents disclose the preparation of monosodium phosphinicobis (succinic acid) and related compounds. These organophosphinic acid mixtures are prepared by reacting maleic acid with sodium hypophosphite in the presence of a water soluble initiator. The optimum molar ratio of maleic acid to hypophosphite is 2.2. These references make it clear that further excesses of maleic acid do not result in an improved product. In contrast with the organophosphonic acids mentioned above, these mixtures are comprised predominantly of a chemically different type of organophosphorus compound, namely organophosphinic acids. The salts of organophosphinic acids are referred to as phosphinates.

U.S. Pat. No. 5,018,577 discloses the use of a predominantly phosphinate containing composition in oil well applications, specifically in squeeze treatments for the prevention and removal of scale from the surfaces of oil wells and formation adjacent to the casings of these wells.

Similarly, U.S. Pat. No. 5,085,794 discloses the reaction product of maleic anhydride, water and a persulfate inhibitor for scale control noting that the disclosed phosphinnicosuccinic acid oligomer is the component deemed crucial as the active chelant or scale inhibitor.

In all of these references citing the use of organophosphinic acids produced from the reaction of hypophosphite with maleic acid for control of scale formation, it is the oligomer portion of the reaction product of the maleic acid, hypophosphite and initiator which is believed to be the key component for use as a scale inhibitor. None of these references teaches the use of the reaction product for a corrosion inhibitor in aqueous systems. Furthermore, none of these references teaches a means to produce the desired organophosphinic acids in a simple process that converts essentially all of the hypophosphite and monomer raw materials into the desirable organophosphinic acid products.

Given the shortcomings noted above, there is a need for a more cost-effective corrosion inhibitor—capable of inhibiting both localized and general corrosion—that is environmentally benign and halogen stable, can maintain its effectiveness in high stress (i.e., long HTI, high $Ca^{2+}$, etc.) conditions and can also prevent scale formation.

SUMMARY OF THE INVENTION

We have discovered an innovative and very effective class of phosphinic acid-based organic corrosion inhibitors. The phosphinosuccinic acid mixture of this invention has all the desirable properties of a corrosion inhibitor, and in particular, is a much more effective corrosion inhibitor than PCAM, a traditional organophosphonic acid mixture. Under certain conditions, the phosphinosuccinic acid mixture is also more effective than $MoO_4^{2-}$, $VO_3^{3-}$ nitrite, HEDP, PBTC, AMP, polyacrylate, phosphonosuccinic acid, orthophosphate, pyrophosphate and gluconate. The phosphinosuccinic acid mixture is also as effective as HPA.

The phosphinosuccinic acid mixture can also be formulated with other components typically used in cooling water treatment (e.g., polymer, orthophosphate, etc.) to provide the most cost-effective corrosion control.

Accordingly, in its principal aspect, this invention is directed to a method of inhibiting corrosion in aqueous systems comprising adding to the system a composition comprising mono, bis and oligomeric phosphinosuccinic acid adducts.

DETAILED DESCRIPTION OF THE INVENTION

The phosphinic acid-based corrosion inhibitor of this invention are used to prevent corrosion of ferrous metals in aqueous systems, preferably industrial water systems including cooling water systems, petroleum systems or mineral process systems. The phosphinic acid-based corrosion inhibitors are added to the aqueous system in an amount of from 0.1 to about 10,000 ppm, preferably from about 0.2 to 100 ppm.

In a preferred aspect of this invention, the industrial aqueous system is a cooling water system.

The phosphinic acid-based corrosion inhibitors can be used alone or in combination with other ferrous metal corrosion inhibitors, yellow metal corrosion inhibitors, scale inhibitors, dispersants, biocides, and industrial aqueous system additives. Such a combination may exert a synergistic effect in terms of corrosion inhibition, scale inhibition, dispersancy and microbial growth control.

Representative corrosion inhibitors that can be used in combination with phosphinic acid-based corrosion inhibitors include, but are not limited to, phosphorus containing inorganic chemicls, such as orthophosphates, pyrophosphates, polyphosphates; hydroxycarboxylic acids and their salts, such as gluconic acids; glucaric acid; $Zn^{2+}$, $Ce^{2+}$; molybdates, vanadates, and tungstates; nitrites; carboxylates; silicates; phosphonates, HEDP and PBTC.

Representative yellow metal corrosion inhibitors that can be used in combination with the phosphinic acid-based corrosion inhibitors include, but are not limited to, benzotriazole, tolytriazole, mercaptobenzothiazole, halogenated azoles and other azole compounds.

Representative scale inhibitors that can be used in combination with the phosphinic acid-based corrosion inhibitors include, but are not limited to polyacrylates, polymethylacrylates, copolymers of acrylic acid and methacrylate, copolymers of acrylic acid and acrylamide, polymaleic acid, copolymers of acrylic acid and sulfonic acids, copolymers of acrylic acid and maleic acid, polyesters, polyaspartic acid, funtionalized polyaspartic acids, terpolymers of acrylic acid, and acrylamide/sulfomethylated acrylamide copolymers, HEDP (1-hydroxyethylidene-1,1-diphosphonic acid), PBTC (2-phosphono-butane-1,2,4-tricarboxylic acid), AMP (amino tri(methylene phosphonic acid) and mixtures thereof.

Representative biocides that can be used in combination with the phosphinic acid-based corrosion inhibitors include, but are not limited to, oxidizing biocides, e.g., $Cl_2$, NaOCl, $Br_2$, NaOBr, chlorine dioxide, ozone, $H_2O_2$, sulfamic acid stabilized chlorine, sulfamic acid stabilized bromine, bromochlorohydantoin, cyanuric acid stabilized $Cl_2$ or $Br_2$, (e.g., trichloroisocyanurate and sodium bromide mixtures, dichloroisocyanurate and NaBr mixtures), or nonoxidizing biocides such as glutaraldehdye, isothiozolines (5-chloro-2-methyl-4-isothiazoline-5-one and 2-methyl-4-isothioazoline-3-one), DBNPA or dibromonitropropianamide, terbuthylazine and quaterary amine.

The phosphinic acid-based corrosion inhibitor of this invention is a composition comprising mono and bis and oligomeric phosphinosuccinic acid adducts of formulas I and II, respectively, as well as one or more oligomeric species. While the mono and bis adducts of formula I and II are represented below as neutral, organophosphinic acid species, it is understood that the phosphinic and carboxylic acid groups may also exist in salt form. In addition to the phosphinosuccinic acids and oligomeric species, the mixture may also contain some phosphonosuccinic acid derivatived from the oxidation of adduct I, as well as impurities such as various inorganic phosphorous byproducts of formula $H_2PO_2^-$, $HPO_3^{2-}$ and $PO_4^{3-}$.

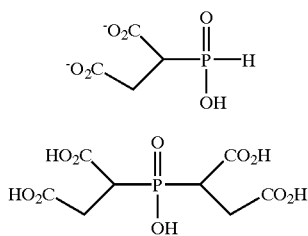

Possible structures for the oligomeric species are proposed in U.S. Pat. Nos. 5,085,794, 5,023,000 and 5,018,577. In addition, the oligomeric species may also contain esters of phosphonosuccinic acid, where the phosphonate group is esterified with a succinate-derived alkyl group.

The mono, bis and oligomeric components are typically characterized by a group of peaks in the proton decoupled phosphorus NMR spectrum in water at pH 5 as follows:

| | |
|---|---|
| Mono: | one peak between 26–29 ppm; |
| Bis: | two peaks between 30–35 ppm; and |
| Oligomer: | multiple peaks between 29–33 ppm. |

In a preferred aspect of this invention, the bis adduct comprises from about 20 to about 85 mole percent based on phosphorous of the composition.

The composition is prepared by (1) adding hypophosphite to a maleic acid or fumaric acid slurry or solution in water to create a reaction mixture; and (2) effecting a reaction by introducing a free radical initiator to the reaction mixture. In the case of a slurry, the solids content is not critical as long as the slurry can be mixed. Typically, the slurry has a solids concentration of about 35–50% by weight.

"Hypophosphite" means hypophosphorous acid or a salt of hypophosphorous acid such as sodium hypophosphite.

The reaction mixture is optionally heated, preferably at from about 40° C. to about 75° C., following addition of hypophosphite to affect conversion to the desired phosphinosuccinic acid adducts in a reasonably short period of time.

The reaction mixture may be partially or totally neutralized with base. A preferred base is aqueous sodium hydroxide which provides a slurry comprised of a maleic and/or fumaric acid salts. Other bases capable of forming salts with fumaric or maleic acid, such as potassium hydroxide and ammonium hydroxide, may also be used. The base may be added before, after, or concurrently with the hypophosphite.

Suitable free radical initiators include persulfates, peroxides and diazo compounds. A preferred initiator is ammonium persulfate. The initiator may be added to the reaction mixture all at once or slowly introduced to the reaction mixture over a period of several hours. The initiator is preferably introduced to the mixture in an amount of between about 10 to about 15 mole percent based on hypophosphite.

In a typical prior art procedure for preparing phosphinic acid compositions, maleic acid with hypohosphite are used in a ratio of about 2:1. The reaction products are predominately mono, bis and oligomeric phosphinosuccinic acid adducts and inorganic phosphates as described above.

We have unexpectedly discovered that if the reaction is carried out with fumaric acid (trans 1,4-butanedioic acid) instead of maleic acid (cis 1,4-butanedioic acid) the ratios of mono, bis and oligomeric phosphinosuccinic acid adducts are altered, resulting in a composition that displays more effective corrosion inhibition properties relative to the composition that is produced when maleic acid is used under the same reaction conditions.

In particular, the fumaric acid-based process provides a simple means to increase the amount of bis adduct in the composition and reduce the amount of byproducts in the composition due to a more efficient conversion of hypophosphite and fumaric acid raw materials into the desired phosphinic acids.

To achieve a similar result in the maleic acid process, a suitable form of maleic acid (such as maleic anhydride) must be added simultaneously with the initiator over the course of the reaction. These conditions are undesirable when carried out on a large scale as they require either the use of specialized equipment to feed a solid reactant to the reactor, a prolonged manual addition of a solid reactant that increases worker exposure to the chemical reactants, or the addition of a comparitively large volume of monomer solution to the reactor that dilutes the product to undesirable levels. In addition, the maleic acid-based process still cannot provide for the efficient conversion of essentially all of the hypophosphite and monomer (maleic or fumaric acid) reactants to the desired organophosphorous products.

The complete conversion of hypophosphite is important because it maximizes the yield of the desired products and minimizes the amount byproducts comprised of the relatively expensive hypophosphite and its oxidation products (inorganic phosphite and phosphate) that can otherwise contribute to scale formation when the desired products are used to inhibit corrosion in aqueous systems.

The complete conversion of monomer (maleic or fumaric acid) is important due to economic considerations (yield maximization) and due to the propensity for unreacted monomer to precipitate out from the product mixture to give a physically unstable product. Thus, the fumaric acid-based process of the instant invention gives a phosphinosuccinic acid product mixture with optimal corrosion inhibiting properties in a manner that is more efficient and effective than previously disclosed processes.

The fumaric acid-based process is, in general, very similar to the maleic acid-based process except that fumaric acid is used in place of maleic acid. Preferably, the fumaric acid is produced by isomerization of maleic acid. More preferably, the fumaric acid is prepared by hydrolyzing maleic anhydride in aqueous solution to prepare an aqueous solution of maleic acid which is then isomerized using heat or a suitable catalyst to form an aqueous solution of fumaric acid.

The isomerization can be accomplished thermally only at high temperatures, so a catalyst is usually used to allow the reaction to proceed under relatively mild conditions. Suitable catalysts for the transformation include thiourea and mixtures of oxidants and various bromine compounds. A preferred catalyst is a mixture of a bromide salt with a persulfate salt (U.S. Pat. No. 3,389,173, *Ind. Eng. Chem. Res.* 1991, 30, 2138–2143, *Chem. Eng. Process.*, 30 (1991), 15–20). Preferably, a mixture of sodium bromide and ammonium persulfate is used to affect this transformation in aqueous media.

The aqueous fumaric acid solution is then converted to the phosphinic acid-based corrosion inhibitor of this invention by addition of hypophosphite and a radical initiator to the fumaric acid solution as described above. A preferred ratio of fumaric acid to hypophosphite in the reaction mixture is about>1.75–3. Preferably, the initiator is added over a period of several hours while the reaction mixture is heated at about 60° C. The reaction is then allowed to proceed until the hypophosphite is almost completely converted to organophosphorous products.

An advantage of this preferred process is that it is more economical because it allows the use of inexpensive maleic anhydride as a raw material instead of the more expensive fumaric acid.

Another advantage of the fumaric acid process is that the total amount of residual inorganic phosphorous in the product is typically less than three mole percent based on total phosphorous.

Accordingly, in another aspect, this invention is directed to a method of preparing a composition comprising mono, bis and oligomeric phosphinosuccinic acid adducts comprising:

i) adding hypophosphite to fumaric acid acid slurry or solution in water to create a reaction mixture; and ii) effecting a reaction by introducing a free radical initiator to the reaction mixture.

In a preferred aspect, the reaction mixture is prepared by converting an aqueous maleic acid slurry to an aqueous fumaric acid slurry.

In another preferred aspect, the reaction mixture has a solids concentration of about 35–50% by weight.

In another preferred aspect, the reaction mixture is neutralized with base.

In another preferred aspect, the mole ratio of fumaric acid to hypophosphite in the reaction mixture is about>1.75–3.

In another preferred aspect, the hypophosphite is selected from the group consisting of hypophosphorous acid or a salt of hypophosphorous acid.

In another preferred aspect, the reaction mixture is heated.

In another preferred aspect, the free radical initiator is slowly introduced to the reaction mixture over a period of several hours.

In another aspect, this invention is directed to an aqueous composition comprising mono, bis and oligomeric phosphinosuccinic acid adducts prepared by:

i) adding hypophosphite to fumaric acid acid slurry or solution in water to create a reaction mixture; and ii) effecting a reaction by introducing a free radical initiator to the reaction mixture.

The foregoing may be better understood by reference to the following Examples, which are presented for purposes of illustration and are not intended to limit the scope of the invention.

EXAMPLE 1

A 2.1/1 molar ratio of fumaric acid to hypophosphite is used in this example. Crushed maleic anhydride briquettes, 75.9 parts, are added to 104.4 parts water in a 1 liter resin flask equipped with a mechanical stirrer, condenser, nitrogen inlet, and heater. The anhydride is allowed to hydrolyze at 40° C. to give a maleic acid solution. The reaction is then heated to 60° C. and a solution of sodium bromide (0.16 parts dissolved in 0.20 parts water) is added, followed immediately by a solution of ammonium persulfate (0.43 parts dissolved in 1.49 parts water). Within 60 minutes, an exothermic reaction ensues that converts the maleic acid solution into 183.6 parts of a 49.2 wt. % slurry of fumaric acid in water as verified by proton NMR.

Sodium hypophosphite monohydrate (38.9 parts) is added to 182.6 parts of a 49.2 wt. % slurry of fumaric acid in water contained in a 1 liter resin flask equipped with a mechanical stirrer, condenser, nitrogen inlet, and heater. A solution of ammonium persulfate (10.9 g dissolved in 36.9 parts water) is then added over a period of 5 hours while the reaction temperature is maintained at 60° C. under a nitrogen blanket. The reaction solution is heated 1–5 hours further, and then adjusted to pH 6 under external cooling with 96.2 parts of a 50% aqueous solution of sodium hydroxide. Finally, 18 parts water is added. The product, comprised of salts hypophosphite/fumarate adducts described in the table below, displays the following molar distribution of components, determined by phosphorous NMR analysis. The first set of data represents the average of four reactions run at 400–600 g scale according to the procedure described above. The second set of data represents a reaction carried out as described above except that the fumaric acid slurry is prepared by mixing fumaric acid with water at a 126 g scale.

| Component | Mole Percent |
|---|---|
| Phosphinicobis(succinic acid) salts (Structure II) | 48, 45 |
| Phosphinicosuccinic acid salts (Structure I) | 17, 24 |
| Phosphonosuccinic acid salts | 8, 4 |
| Phosphinicosuccinic acid oligomer salts (Structure III) | 27, 27 |
| Hypophosphite, phosphite, and phosphate salts | <1, <1 |

EXAMPLE 2

A 2.5/1 ratio of fumaric to hypophosphite is used in this Example. The reaction conditions are as described in Example 1. The product, comprised of salts of hypophosphite/fumarate adducts described in the table below, displays the following molar distribution of components determined by phosphorous NMR analysis.

| Component | Mole Percent |
|---|---|
| Phosphinicobis(succinic acid) salts (Structure II) | 49 |
| Phosphinicosuccinic acid salts (Structure I) | 7 |
| Phosphonosuccinic acid salts | 3 |
| Phosphinicosuccinic acid oligomer salts (Structure III) | 38 |
| Hypophosphite, phosphite, and phosphate salts | <1 |

EXAMPLE 3

This is a comparative example, using maleic acid instead of fumaric acid at the same 2.5/1 mole ratio as Example 2. It demonstrates that the results obtained with fumaric acid are unanticipated. The first data set is the results obtained in the lab using the general procedure above, and the second data set is a plant run using the same mole ratio maleic to fumaric. The general reaction conditions described in Example 1 are repeated except that maleic acid is substituted for fumaric acid at the same molar concentration. The product, comprised of salts of hypophosphite/maleate adducts described in the table below, displays the following molar distribution of components determined by phosphorous NMR analysis.

| Component | Mole Percent |
|---|---|
| Phosphinicobis(succinic acid) salts (Structure II) | 22,17 |
| Phosphinicosuccinic acid salts (Structure II) | 24,22 |
| Phosphonosuccinic acid salts | 2,12 |
| Phosphinicosuccinic acid oligomer salts (Structure III) | 43,35 |
| Hypophosphite, phosphite, and phosphate salts | 5, 8 |

EXAMPLE 4

This example uses a low 1.75/1 ratio of fumaric to hypophosphite. It does not yield >30% bis product and has a higher level of undesirable inorganic phosphorous. The reaction conditions described in Example 1 are repeated except that a larger amount of hypophosphite is employed so that the molar ratio of fumaric acid to hypophosphite is 1.75/1. The product, comprised of salts of hypophosphite/fumarate adducts described in the table below, displays the following molar distribution of components determined by phosphorous NMR analysis.

| Component | Mole Percent |
|---|---|
| Phosphinicobis(succinic acid) salts (Structure II) | 30 |
| Phosphinicosuccinic acid salts (Structure I) | 35 |
| Phosphonosuccinic acid salts | 8 |
| Phosphinicosuccinic acid oligomer salts (Structure III) | 22 |
| Hypophosphite, phosphite, and phosphate salts | 6 |

EXAMPLE 5

This example uses a 2.1/1 ratio of substantially neutralized sodium fumarate slurry demonstrating that the process works over a wide pH range by use of a salt fumaric acid. In this case, about 80% of the fumaric acid carboxylic acids have been converted to the sodium carboxylate form, and the pH is raised from about 1 to about 6.

Sodium hypophosphite monohydrate (13.0 g) is added to 61.0 of a 49.1 wt. % slurry of fumaric acid in water contained in a 250 ml. resin flask equipped with a mechanical stirrer, condenser, nitrogen inlet, and heater. Aqueous 50% sodium hydroxide, 32.1 g, is then added under mixing and cooling. A solution of ammonium persulfate (3.6 g dissolved in 6.0 g water) is then added over a period of 5 hours while the reaction temperature is maintained at 60° C. under nitrogen blanket. The reaction solution is heated 1–5 hours further, and 6 g water is added. The product, comprised of salts of hypophosphite/fumarate adducts described in the table below, displays the following molar distribution of components, determined by phosphorous NMR analysis.

| Component | Mole Percent |
|---|---|
| Phosphinicobis(succinic acid) salts (Structure II) | 46 |
| Phosphinicosuccinic acid salts (Structure I) | 18 |
| Phosphonosuccinic acid salts | 8 |
| Phosphinicosuccinic acid oligomer salts (Structure III) | 26 |
| Hypophosphite, phosphite, and phosphate salts | <1 |

EXAMPLE 6

Step 1: Monosodium Phosphinocobis(dimethyl succinate)

A 2.1 /1 molar ratio of dimethyl maleate to hypophosphite is used in this example. Sodium hypophosphite, 7.325 parts, are added to 6.25 parts water and 12.5 parts ethanol in a resin flask equipped with a magnetic stirrer, condenser, nitrogen inlet, heater and a dropping funnel. This solution is heated to 80° C. A solution consisting of 20.75 parts dimethyl maleate, 0.86 parts benzoyl peroxide (70% solution) and 25 parts ethanol is then added dropwise to the reaction flask over a period of 4.75 hours. The reaction mixture is heated for an additional 15 minutes then cooled. The solvent is removed by rotary evaporation under reduced pressure.

Step 2: Sodium Phosphinocobis(succinate)

34.5 parts of monosodium phosphinocobis(dimethyl succinate) are added to 20 parts water and 55.4 parts of a 50% aqueous solution of sodium hydroxide in a reaction flask equipped with a magnetic stirrer, condenser, and heater. The reaction is heated to 100° C. and maintained at that temperature for 2 hours. The product is diluted with 20 parts water and then neutralized with 40.4 parts hydrochloric acid to about pH 6.

The product, comprised of salts of hypophosphite/maleate adducts described in the table below, displayed the following molar distribution of components determined by phosphorous NMR analysis.

| Component | Mole Percent |
|---|---|
| Phosphinicobis(succinic acid) salts (Structure II) | 88 |
| Phosphinicosuccinic acid salts (Structure I) | 9 |
| Phosphonosuccinic acid salts | 1 |
| Hypophosphite, phosphite, and phosphate salts | 2 |

EXAMPLE 7

Electrochemical Tests to determine corrosion rate For Tables 1–3. A pre-polished carbon steel (mild steel, C1010 or C1008) cylindrical tube (length=0.5 in, outer diameter= 0.5 in, area=5 cm$^2$) sealed with MICROSTOP STOP-OFF™ lacquer (Pyramid Plastic Inc.) and installed on a Pine rotator is used as the working electrode. The electrode is polished with a 600 grit SiC sand paper, washed with acetone and deionized water, and dried with a piece of clean Kimwipes™ before applying the lacquer. Then the electrode is placed in the air for ~15 minutes to allow the paint to dry before immersion. The counter electrode is two high density graphite rods. A saturated calomel electrode or a Ag/AgCl electrode is used as the reference electrode. Solution Ohmic drop is minimized by placing the small Luggin capillary opening about 1~2 mm from the working electrode surface. A.C. impedance experiments shows that the ohmic drop in the low corrosion rate conditions (e.g., $R_p$>3000 ohm cm$^2$ or<7~9 mpy) usually contributed to not greater than 10% of the total measured polarization resistance ($R_p$).

Test cells holding 700 ml ((for Table 3, 10.8 liters) solution are used in the tests. The test solutions are prepared from deionized water, analytical grade chemicals and chemicals synthesized according to the method described in this invention. The solution is aerated and allowed to come to thermal and chemical steady-state (typically~0.5 hours) before immersing the working electrode. All the openings of the cell are covered with either a rubber plug or Saran Wrap™ to minimize solution loss due to evaporation. The loss due to evaporation is usually less than 10% in 24 hours. The bench-top corrosion tests are conducted at 38°±0.3° C., or 48.9°±0.3°, unless specified otherwise. A pH controller controlled the pH of the test solution by feeding either dilute H$_2$SO$_4$ or CO$_2$ gas (CO$_2$ is used only in the tests listed in Table 3). The test solutions are also aerated by purging with air during the tests.

A Gamry potentiostat and Gamry corrosion software are used to conduct the electrochemical measurements. After>16 hours immersion, the polarization resistance of the electrode is determined by imposing a small overpotential (±15 mV versus $E_{corr}$) on the working electrode and measuring the resulting current under steady state conditions. Quasi-steady-state potentiodynamic cathodic and anodic scans (e.g., 0.5 mV/sec) are conducted immediately after the polarization resistance measurement. These measurements are commenced at the corrosion potential and polarized up to 200 mV in either cathodic or anodic direction. The cathodic branch is recorded first. The anodic scan is conducted ~0.5 hours after the completion of the cathodic scan. The surface area averaged (or general) corrosion rates are determined from extrapolation of either the anodic branch or cathodic branch of the linear log(i) versus potential region of the polarization curve to the corrosion potential or are determined from the polarization resistance with the use of the Stem-Geary equation. The Tafel slopes of 200 mV/dec for both anodic and cathodic polarization curves determined from the average values of several quasi-steady-state potentiodynamic scans measurements and prior experience are used to calculate the general corrosion rates from the measured polarization resistances. The corrosion rates shown in the Tables 1–3 are calculated as the average of polarization resistance rate, anodic Tafel and cathodic Tafel extrapolation rates.

In some cases (i.e., the results in Table 3 and the results at 100 F. in Table 1), the carbon steel electrodes are first prepassivated in 0.5 wt % sodium benzoate solution for 2 to 20 hr at the test temperature before immersing in the test cell. No significant differences (e.g., corrosion rate differences are less than 20–30% from each other) are noted in the corrosion rates obtained from the different sample preparation methods described here under comparable test conditions.

All solutions are prepared by using analytical grade chemicals, commercially available products, or compounds synthesized according to the procedure described in the instant invention.

TABLE 1

Corrosion Inhibitor Screening Test Results-Hard Water
360 ppm CaCl$_2$, 200 ppm MgSO4, 100 ppm NaHCO$_3$, pH = 8.4,
120° F., 160 rpm; 16 hours immersion

| Compound | Dosage as Active in Acid Form or Stated | MS General Corrosion Rate (mpy) | |
|---|---|---|---|
| Blank | None | 43.50 | |
| Orthophosphate | 15 ppm as PO$_4$ | 17.35 | |
| Pyrophosphate | 30 ppm as PO$_4$ | 11.99 | |
| HPA | 15 ppm | 2.13 | |
|  | 30 ppm | 2.47 | Av. of 3 tests |
| PCAM | 15 ppm | 15.43 | |
| PCAM | 20 ppm | 6.26 | |
| PCAM | 30 ppm | 23.68 | |
| PCAM | 40 ppm | 15.28 | Av. of 6 tests |
| Example 1 | 15 ppm | 2.78 | |
| Example 1 | 20 ppm | 2.16 | |
| Example 1 | 30 ppm | 0.97 | |
| Example 1 | 40 ppm | 2.17 | Av. of 2 tests |
| HEDP | 15 ppm | 13.05 | |
| HEDP | 30 ppm | 8.09 | |
| AMP | 15 ppm | 9.25 | |
| AMP | 30 ppm | 16.11 | |
| PBTC | 15 ppm | 6.17 | |
| PBTC | 30 ppm | 10.49 | |
| Polyacrylate (MW = 2000) | 15 ppm | 11.84 | |
| Polyacrylate (MW = 2000) | 30 ppm | 34.49 | |
| Molybdate | 15 ppm as MoO$_4$ | 19.89 | |
| Vanadate | 15 ppm as VO$_3$ | 17.43 | |
| Nitirte | 30 ppm as NO2 | 9.38 | |
| Zn$^{2+}$ | 5 ppm as Zn | 37.24 | |
| Gluconate | 30 ppm | 5.69 | |
| Phsophonosuccinic acid | 15 ppm | 6.80 | |
| Blow results are obtained at 100° F. | | | |
| Blank | None | 21.5 | Av. of 2 tests |
| Example 1 | 40 ppm | 0.98 | Av. of 2 tests |
| Example 1 + Polymer 1 | 40 ppm Example 1 + 10 ppm Polymer 1 | 0.92 | Av. of 3 tests |
| PCAM + Polymer 1 | 40 ppm PCAM + 10 ppm Polymer 1 | 19.50 | Av. of 3 tests |

Note: HPA = 2-hydroxy-phosphonacetic acid
PCAM = phosphonocarboxylic acid mixture, H—[CH(COOH)CH(COOH)]$_n$—PO$_3$H$_2$, where n < 5 and n$_{mean}$ = 1.4
HEDP = 1-hydroxyethylidene-1,1-diphosphonic acid
AMP = Amino tri(methylene phosphonic acid)
PBTC = 2-phosphono-butane-1,2,4-tricarboxylic acid
Polymer 1 = Acrylic acd (50–60 mole %)/acrylamide (20–36 mole %)amino methane sulfonate (14–20%) terpolymer The results in Table 1 show that the compounds of this invention (i.e., example 1) are much more effective mild steel corrosion inhibitors than PCAM. The compound of Example 1 is also more effective than $MoO_4^{2-}$, $VO_3^{3-}$, nitrite, HEDP, PBTC, AMP, polyacrylate, phosphonosuccinic acid, o-PO$_4$, p-PO$_4$ and gluconate. It is as effective as HPA. In the presence of a phosphate dispersant polymer (polymer 1, commonly used in cooling water systems to prevent scale formation). The compound of Example 1 is still a more effective mild steel corrosion inhibitor than PCAM.

We claim:

1. A method of inhibiting corrosion in aqueous systems comprising adding to the system a phosphonosuccinic acid composition comprising mono, bis and oligomeric phosphinosuccinic acid adducts, wherein the phosphinosuccinic acid composition comprises about 36 to about 49 mole percent bis phosphinosuccinic acid adducts and about 26 to about 35 mole percent oligomeric phosphinosuccinic acid adducts.

2. The method of claim 1 wherein the aqueous system is an industrial aqueous system.

TABLE 2

Corrosion Inhibitor Screening Test Results: The Effect Composition Changes

| | Treatment Composition (based on P$^{31}$ NMR Results) | | | | | MS General Corrosion Rate (mpy) | | |
|---|---|---|---|---|---|---|---|---|
| Treatment ID | Mono Adduct (%) | Bis adduct (%) | Oligomer (%) | Ing P (%) | PSA (%) | 15 ppm Treatment | 30 ppm Treatment | Note |
| A | 34 | 17 | 35 | 8 | 5 | 11.9 | 17.7 | |
| B | 66 | 15 | 0 | 18 | 1 | 11.8 | 3.16 | |
| C | 65 | 15 | 0 | 20 | 0 | 5.72 | 5.78 | |
| D (example 1) | 15 | 49 | 28 | <1 | 7 | 2.78 | 0.97 | |
| E | 19 | 45 | 29 | 1 | 6 | 2.16 (20 ppm) | 2.17 (40 ppm) | |
| F | 0 | 43 | 27 | 0 | 27 | 2.69 | N/A | 3% Unidentified |
| G | 0 | 0 | 60 | 3 | 31 | 21.1 | 9.2 | 6% Unidentified |
| H | 9 | 0 | 56 | 4 | 15 | 6.9 | 12.2 | 18% Unidentified |
| PSA | 0 | 0 | 0 | 0 | 100 | 6.8 | 27.1 | |
| PCAM | 0 | 0 | 0 | 0 | 60 | 15.4 | 23.6 | |
| Blank | 0 | 0 | 0 | 0 | 0 | 43.5 | | |

Hard Water: 360 ppm $CaCl_2$, 200 ppm $MgSO_4$, 100 ppm $NaHCO_3$, (all as $CaCO_3$), pH = 8.4, 120F, 160 rpm, 16 hours immersion

TABLE 3

Corrosion Inhibitor Screening Test Results: The Effect of Composition Changes
Conditions: 40 ppm total inhibitor concentration except for the blank test, which has no inhibitor
C1008 Electrode, 360 ppm CaCl2, 200 ppm MgSO4, 100 ppm NaHCO3, (all as CaCO3),
pH = 8.4, 100F, 160 rpm, 24–72 hours immersion.

| | Treatment Composition based on P31 NMR results | | | | | MS General Corrosion Rate (mpy) |
|---|---|---|---|---|---|---|
| Treatment | Mono Adduct (%) | Bis adduct (%) | Oligomer (%) | Ing P (%) | PSA (%) | |
| I | 25 | 36 | 31 | 1.2 | 7 | 0.98 |
| J | 15.9 | 42 | 34.6 | 0.8 | 6.7 | 1.82 |
| D (Example 1) | 15 | 49 | 28 | <1 | 7 | 1.36 |
| 50% D + 50% K | 12 | 68.7 | 14 | 1.3 | 4 | 2.70 |
| 25% D + 75% K | 10.5 | 78.6 | 7 | 1.2 | 2.5 | 1.83 |
| K | 9 | 88.4 | 0 | 1.6 | 1 | 7.67 |
| Blank | 0 | 0 | 0 | 0 | 0 | 21.5 |

The data in Tables 2 and table 3 show that (1) mixtures of phosphinosuccinic acid adducts, comprising various percentages of mono, bis and oligomeric adducts, are effective mild steel corrosion inhibitor; and (2) the best corrosion inhibition activity will be obtained if the bis adduct has a percentage ranging from more than ~17% to less than 88%.

While the principles of the invention have been shown and described in connection with but a few embodiments, it is to be understood clearly that such embodiments are by way of example and are not limiting.

3. The method of claim 1 wherein the industrial aqueous system is a cooling water system.

4. The method of claim 1 further comprising adding to the aqueous system an effective amount of one or more ferrous metal corrosion inhibitors, yellow metal corrosion inhibitors, scale inhibitors, dispersants, biocides, and industrial aqueous system additives.

* * * * *